Patented June 19, 1934

UNITED STATES PATENT OFFICE 1,963,566

MANUFACTURE OF PIGMENTS

George F. A. Stutz, Palmerton, Pa., assignor to The New Jersey Zinc Company, New York, N. Y., a corporation of New Jersey No Drawing. Application January 23, 1931, Serial No. 510,763

9 Claims. (Cl. 134—78)

This invention relates to the manufacture of pigments by wet chemical precipitation, and more especially of pigments of the type requiring heat treatment for imparting adequate pigment properties thereto. The invention is more particularly concerned with the operation of precipitating such pigments, and has for its principal object the carrying out of the precipitating operation in an improved manner.

In the heretofore customary practice of manufacturing lithopone, zinc sulfide, and similar pigments requiring heat treatment for the development of adequate pigment properties, the precipitating operation is conducted in open tanks at atmospheric pressure, and the crude precipitate (after appropriate drying) is muffled or calcined at an appropriate elevated temperature. I have discovered that the precipitation of the pigment under conditions of pressure considerably in excess of the atmospheric pressure not only improves the precipitating operation itself but also improves the physical properties of the finished pigment product. I have furthermore discovered that when the precipitation of the pigment is carried out under such conditions of high pressure in conjunction with a temperature in excess of 100° C. still greater improvements are effected in both the operation and the product thereof.

My present invention, based on these discoveries, accordingly involves, in its broad aspect, carrying out the precipitation of the pigment under conditions of pressure considerably in excess of the atmospheric pressure. In another aspect, the invention involves carrying out the precipitation of the pigment under such conditions of high pressure and at temperatures in excess of 100° C. In its preferred aspect, the invention contemplates carrying out the precipitation of a pigment under a pressure of at least 1000 pounds per square inch; pressures of 3000 pounds per square inch and higher being particularly advantageous.

As a specific example of the practice of the invention, I will consider its application to the manufacture of lithopone. The precipitating apparatus may conveniently consist of a closed vessel or tank within which may be established and maintained the contemplated condition of high pressure. Where a high or elevated temperature is employed in conjunction with the high pressure, an autoclave or the like may advantageously be used as the precipitating apparatus. The precipitating liquors (aqueous solutions of zinc sulfate and barium sulfide) are introduced into the precipitating apparatus in such a manner as to continuously and uniformly mix the two liquors, thereby precipitating the lithopone. The pressure within the precipitating apparatus is maintained considerably in excess of the atmospheric pressure, and preferably in excess of 200 pounds per square inch. While the high pressure alone effects an improvement in the precipitating operation, the full advantages of the invention are better realized by the combination of the high pressure with a temperature in excess of 100° C. A precipitate of excellent fineness and uniformity in particle size is produced when the precipitation is carried out under a pressure of about 1000 pounds per square inch and at a temperature of approximately 200° C.

The precipitating liquors introduced into the precipitating apparatus may be of about the same concentrations as heretofore employed in the industry. We prefer, however, to employ higher concentrations of the precipitating liquors than heretofore customary. Excellent results have been obtained with a zinc sulphate liquor of about 35° Bé. and a barium sulphide liquor of about 25° Bé.

The precipitating operation may be carried out in a continuous manner or as a batch operation. When precipitation is completed, the crude precipitate is removed in any appropriate manner from the environment of high pressure under which it is formed and subjected to such subsequent treatment operations as may be necessary or desirable. Thus, the crude lithopone pulp may be discharged from the high pressure precipitating apparatus into appropriate storage tanks, or otherwise appropriately conducted to the subsequent operations of filtering, drying, calcining, etc.

Where the precipitation is conducted under pressure and at an elevated temperature, a certain heat treatment of the precipitated pigment may be effected by holding the precipitate for a suitable length of time at the high pressure and elevated temperature. In general, the higher the pressure under which these operations are carried out, the lower is the temperature or the shorter is the time of treatment at the same temperature, in order to attain the same degree of heat treatment. A heat treatment of lithopone equivalent to that resulting from the heretofore customary muffling or calcining operation is attained under pressures of from 2000 to 3000 pounds per square inch at a temperature of about 350° C. with a treatment period of approximately one hour.

When precipitation is conducted at ordinary room temperatures, or only slightly higher, the contemplated high pressure is conveniently attained by introducing into the closed precipitating apparatus an inert gas, such as nitrogen, under an appropriate pressure. Any desired high pressure can be thus attained at practically any desired temperature.

When the pigment is precipitated from aqueous solutions at high or elevated temperatures, the pressure must be at least that of saturated steam at the prevailing temperature. Using water as the solvent, the maximum pressure obtainable (without the use of an inert gas) is approximately 3300 pounds per square inch; the pressure of saturated steam at the critical temperature. The use of solvents other than water makes possible the use of a different range of temperatures and pressures than obtainable with aqueous solutions. The introduction into the precipitating apparatus of an inert gas under an appropriate pressure permits the establishment of a pressure higher than that of saturated steam (or other solvent vapor) at the prevailing high temperature. Thus, pressures considerably in excess of 3,000 pounds per square inch may be advantageously established within the precipitating apparatus by the use of an appropriate inert gas under a suitable pressure, at any temperature that might be desired in practice.

I claim:

1. The improvement in the method of making by wet chemical precipitation a pigment containing zinc sulfide and requiring heat treatment for imparting adequate pigment properties thereto, which comprises carrying out the precipitation of the pigment under a pressure of at least 200 pounds per square inch to improve the pigmentary properties of the pigment.

2. The improvement in the method of making a pigment containing zinc sulfide by wet chemical precipitation, which comprises carrying out the precipitation of the pigment in a closed chamber under a pressure exceeding 1,000 pounds per square inch.

3. The improvement in the method of making a pigment containing zinc sulfide by wet chemical precipitation, which comprises carrying out the precipitation of the pigment under a pressure of at least 3000 pounds per square inch.

4. The improvement in the method of making by wet chemical precipitation a pigment containing zinc sulfide and requiring heat treatment for imparting adequate pigment properties thereto, which comprises carrying out the precipitation of the pigment under a pressure of about 2,000 to 3,000 pounds per square inch.

5. The improvement in the method of making by wet chemical precipitation a pigment containing zinc sulfide and requiring heat treatment for imparting adequate pigment properties thereto, which comprises carrying out the precipitation of the pigment at a temperature substantially in excess of 100° C. and under a pressure of at least 200 pounds per square inch.

6. The improvement in the method of making by wet chemical precipitation a pigment containing zinc sulfide and requiring heat treatment for imparting adequate pigment properties thereto, which comprises carrying out the precipitation of the pigment under conditions of elevated temperature and pressure exceeding 200 pounds per square inch.

7. The improvement in the method of making a pigment containing zinc sulfide by wet chemical precipitation, which comprises carrying out the precipitation of the pigment under a pressure of at least 1000 pounds per square inch and at a temperature of at least 100° C.

8. The improvement in the method of making by wet chemical precipitation a pigment containing zinc sulfide and requiring heat treatment for imparting adequate pigment properties thereto, which comprises carrying out the precipitation of the pigment under a pressure of at least 1000 pounds per square inch and at a temperature not lower than 200° C.

9. The improvement in the method of making by wet chemical precipitation a pigment containing zinc sulfide and requiring heat treatment for imparting adequate pigment properties thereto, which comprises carrying out the precipitation of the pigment from aqueous solutions under a pressure of from 2,000 to 3,000 pounds per square inch and at a temperature approximating that of saturated steam at the prevailing pressure.

GEORGE F. A. STUTZ.